March 30, 1954 W. C. GRIFFIN ET AL 2,673,484
APPARATUS FOR EMULSION OBSERVATION
Filed July 3, 1951 2 Sheets-Sheet 1

WILLIAM C. GRIFFIN,
ROBERT W. BEHRENS,
INVENTORS.

BY
Robert J. Mawhinney

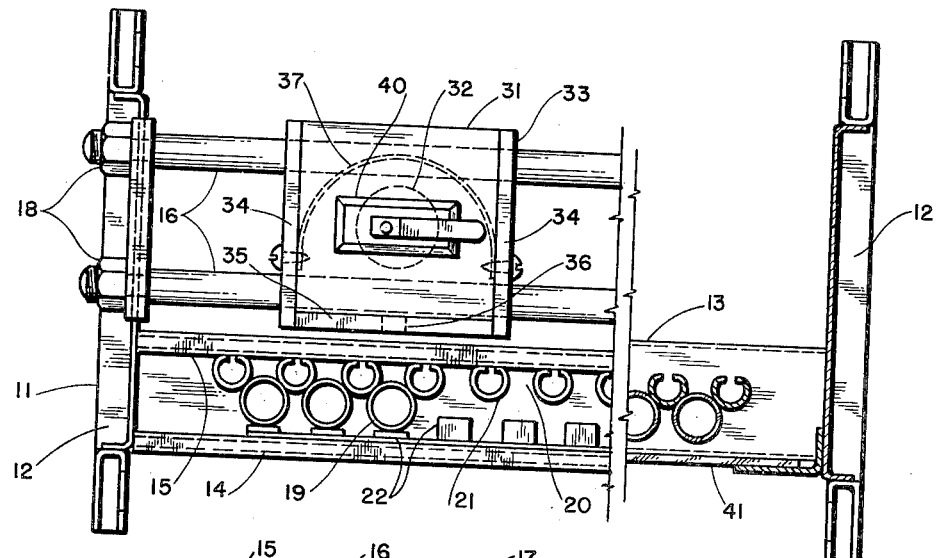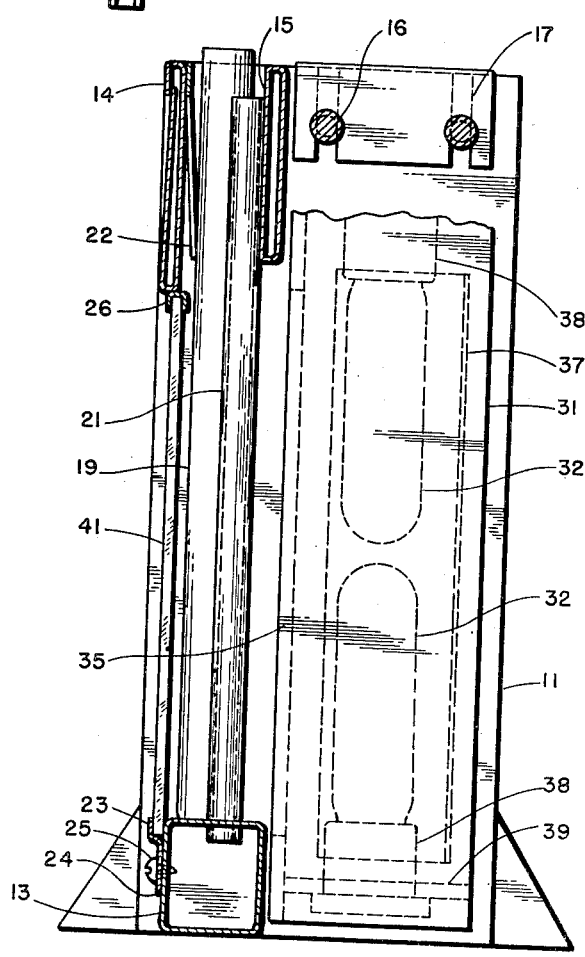

Patented Mar. 30, 1954

2,673,484

UNITED STATES PATENT OFFICE 2,673,484

APPARATUS FOR EMULSION OBSERVATION

William C. Griffin, West Chester, Pa., and Robert W. Behrens, Newport, Del., assignors to Atlas Powder Company, Wilmington, Del., a corporation of Delaware Application July 3, 1951, Serial No. 235,058

2 Claims. (Cl. 88—14)

This invention relates to laboratory apparatus, and more particularly to an improved apparatus for visually determining the extent of phase separation in emulsions.

The large increase in number and variety of emulsifying agents and emulsifying techniques noted in recent years has greatly complicated the problem of evaluating emulsifying agents and emulsions for selected uses. When emulsions break cleanly into transparent oil and aqueous phases the rate of separation is readily followed by visual observation. With modern improved emulsifiers, and particularly with mixed emulsifiers, separation of clear phases on storage of emulsions is the exception rather than the rule. Instead, instability of emulsions frequently is evidenced only by the formation on storage of two layers, each of which contains disperse phase and dispersion media, but in relatively different concentrations. This phenomenon may conveniently be referred to as "creaming" by analogy with the rising of cream from whole milk. When, as is often the case, the two layers of a creamed emulsion are of similar optical density the fact that separation is occurring will be missed on examination of containers of the emulsion by reflected or randomly refracted light. In order to choose the most effective from a number of closely competing emulsifying agents, the technologist must base a decision upon differences in the creaming rate of emulsions made with the several agents. It is imperative that he not be misled by the formation of creams in which the cream line is virtually invisible or difficult to place by direct observation.

It is the primary object of the invention to provide an improved apparatus for determining phase separation of emulsions by transmitted light and observing directly the relative proportions of separated layers.

Other objects will become apparent in the course of the following description and the appended claims.

The essentials of the apparatus comprise a rack for vertically supporting tubes containing the samples to be examined, means for horizontally transmitting light selectively through tubes one tube at a time, light shielding means for cutting off the transmitted light which does not pass through the said tubes, and means for measuring the relative heights of the separated layers in each of said samples.

In a preferred form of the invention, the light shielding means are the spacer elements forming the sample tube receptacles, provision being made for holding the tubes snugly thereagainst. An optically unobstructed path is provided between the eye of the observer and the tubes under examination with a vertical scale on at least one side of said path, to which the position of the cream line can be referred for estimation of the relative proportions of the separated layers.

A specific embodiment of the apparatus of the invention is shown in the accompanying drawings wherein, Figure 1 is a front elevational view.

Figure 2 is a plan view, partly in section as indicated by the line 2—2 of Figure 1.

Figure 3 is a side elevation view in section along the line 3—3 of Figure 1.

In the several drawings like reference numerals refer to like parts.

Figure 1:
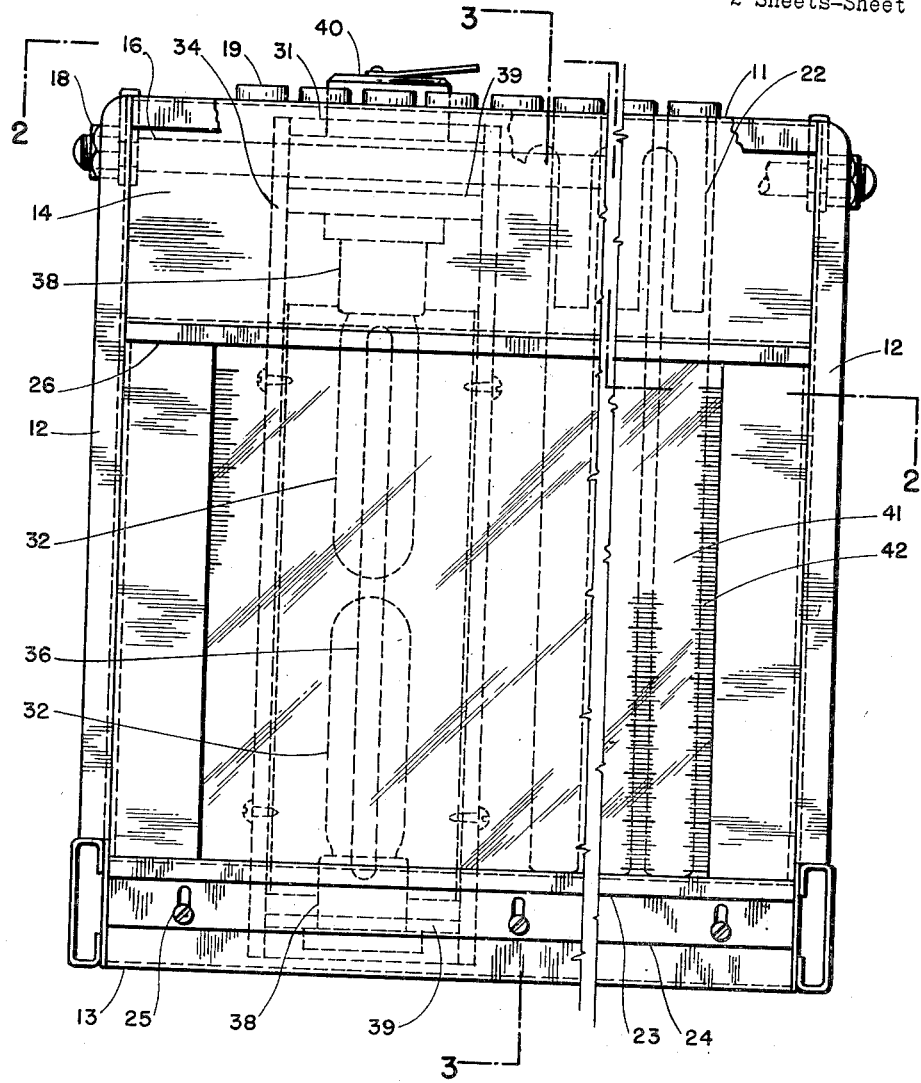

The apparatus comprises generally a plurality of sample tubes 19 supported in a rack 11, a lamp and housing therefor indicated generally by 31, and a transparent scale plate 41. The rack consists of end plates 12, joined to the ends of a base rail 13, and to the ends of front and rear upper rails 14 and 15, respectively. Behind the rear upper rail 15, two rods 16 are positioned between covered slots 17 in the end plates, and held in position by nuts 18 threaded thereon. The said rods serve to support the lamp housing 33 to be described more fully hereinafter.

The vertical distance between the base rail 13 and the upper rails 14 and 15 is such as to expose a convenient depth of test emulsions for observation in sample tubes 19 which rest on said base rail and extend between the said upper rails. The sample tubes may be of any convenient size, preferably being not less than about a quarter of an inch nor more than about an inch in diameter. Tubes of approximately three-fourths inch diameter have been found particularly satisfactory. The said tubes are held in evenly spaced positions along said rack in slots formed by vertical spacer elements 21 (Figures 2 and 3), the opposite ends of which are fastened by any suitable means to the base rail and the rear upper rail. In the particular form illustrated, the lower ends of the spacer elements 21 are held by being extended through holes formed in the top of the base rail 13, and the upper ends of said spacer elements are soldered or welded to the rear upper rail 15. The slots 20 are slightly less in width than the diameter of sample tubes 19, and spring members 22 mounted on the front upper rail 14 press the tubes firmly against said spacer elements throughout their vertical length.

In front of the tubes is scale plate 41, supported between an upper channel 26, which is integral with the front upper rail 14, and lower channel 23, formed between the base rail 13 and the bent strip 24. The said strip is held in place by screws 25, through slots in the strip which permit slight vertical adjustment of the position of the scale plate 41.

The scale plate 41 is transparent, suitably of glass, and carries a plurality of vertical scales, 42, etched, imprinted, or otherwise marked thereon. Conveniently, though not necessarily, these scales are divided in 100 parts as indicated in Figure 1 and each substantially traverses the vertical distance between the base rail and the front upper rail. In use, the scale plate preferably is adjusted vertically so that the base lines of the scales are in the same horizontal plane as the bottom of the liquid in sample tubes 19, resting vertically on base rail 13.

The length of the graduation lines of scales 42 is substantially the same as the width of the spacer elements 21, and the scales are so positioned on plate 41 that they lie directly in front of said spacer elements, leaving clear, transparent vertical stripes in front of those portions of the tubes through which the spacer bars permit transmission of light.

Direct illumination for examining the contents of individual sample tubes by transmitted light is provided by the lamp and housing assembly designated generally by 31. The source of light is provided by elongated, incandescent filament electric lamps 32 of the clear glass type. These are mounted in a housing 33 depending from rods 16 and in slidable connection therewith. The housing comprises vertical side walls 34, a front wall 35, containing an elongated vertical slot 36, approximating in length and width the openings formed by spacer elements 21 between the base rail 13 and rear upper rails 15. A curved reflector 37 constitutes the back wall of the said housing. Wired lamp sockets 38 are fastened to the end plates 39 of the lamp housing to receive lamps 32. A normally open switch 40 is included in electrical series with the lamps 32 and mounted on top of housing 33, whereby the lamps may conveniently be lighted only momentarily. It has been found that the stability of many test emulsions is affected by heat and, since the illumination required to make the cream line visible may be of heat producing intensity, provision for illuminating the tubes one at a time and only momentarily, is a very desirable feature of the invention.

The operation of the apparatus is nearly self-evident from its illustration and description. Samples of emulsions to be observed for phase separation rates are introduced into the tubes 19, the tubes being filled to a depth corresponding to the full length of the scales 42. At selected time intervals, as desired, the light source is brought into position directly behind the tubes individually, the switch 40 is pressed and the contents of the tube observed for presence or absence of a cream line. If separation has occurred the fraction of the total represented by each phase may be readily estimated by reference to the adjacent scales 42 on either side of the illuminated tube. If the scales are graduated by 100 evenly spaced lines the fractions are readable directly in volume percent. The spacer elements 21, against which the sample tubes are held firmly by spring members 22 serve as light shields to prevent distraction of the observer by illumination other than that through the test emulsion. Stray light is further cut down by the slot 36 in light housing 33 which is substantially as wide as the opening between the said light shielding spacer members. The cream line in a separating emulsion is much more readily discernible in the harsh light of a bare incandescent filament than in the diffuse light of the usual fluorescent light tubes or of frosted bulb incandescent filament lamps and the apparatus of the invention is supplied with such a light source.

Quite unexpectedly it was found to be very important that scale plate 41 be ruled discontinuously producing a plurality of scales 42 rather than a single scale of graduation lines running the length of the plate. The presence of graduation lines across that portion of the plate directly illuminated through the sample tube while making an observation obscures the cream line completely in many instances and interferes with estimating its exact position in others. By placing the scales in the shadow of the spacer elements 21 this interference is eliminated. Light scattering by the translucent emulsion under observation directs sufficient light angularly outward to illuminate the graduation lines on either side of the tube under observation and, by alignment with said graduation lines the vertical position of the cream line in the sample tube is accurately estimable.

Variations in constructional details of the apparatus will readily suggest themselves to those skilled in the art, and apparatus embodying such variations is considered to come within the scope of the invention provided it accomplishes the same purpose by essentially the same method.

What is claimed is:

1. An apparatus for determining phase separation in emulsions which comprises a plurality of transparent sample tubes; a rack adapted to hold said tubes vertically in horizontally spaced relation; a vertically disposed, incandescent filament light source slidably mounted on said rack behind said tubes; light shielding means cooperating with said tubes and said light source to confine illumination from said source to one of said tubes at a time as the said light source is slidably moved in its mounting behind said tubes; and a transparent plate supported by said rack in front of said tubes, said plate bearing a plurality of vertical scales, said scales being spaced apart to leave unmarked transparent vertical bands registering with said sample tubes in the rack.

2. In an apparatus for determining phase separation in emulsions, a rack providing receptacles for holding a plurality of tubes vertically in horizontally spaced relation; a vertically disposed light source slidably mounted on said rack behind said tube receptacles; spacer elements between the said receptacles which confine illumination from said source to one of said receptacles at a time as the said light source is slidably moved in its mounting; and a transparent plate supported by said rack in front of said tube receptacles, said plate bearing a plurality of vertical scales spaced apart to leave unmarked transparent vertical bands registering with said tube receptacles in the rack.

WILLIAM C. GRIFFIN.
ROBERT W. BEHRENS.

References Cited in the file of this patent

UNITED STATES PATENTS

| Number | Name | Date |
|---|---|---|
| 1,023,925 | Court | Apr. 23, 1912 |
| 1,513,372 | Clark | Oct. 28, 1924 |
| 1,648,369 | Svedberg et al. | Nov. 8, 1927 |
| 1,706,857 | Mathe | Mar. 26, 1929 |
| 2,114,460 | Zeigler | Apr. 19, 1938 |
| 2,253,581 | Reynolds | Aug. 26, 1941 |
| 2,353,127 | Davis | July 11, 1944 |
| 2,379,158 | Kalischer | June 26, 1945 |